(12) United States Patent
Persson et al.

(10) Patent No.: US 10,170,821 B2
(45) Date of Patent: Jan. 1, 2019

(54) SELF-CONFIGURING COMMUNICATION NODE ARRANGEMENT

(71) Applicant: TELEFONAKTIEBOLAGET L M ERICSSON (PUBL), Stockholm (SE)

(72) Inventors: Lars Persson, Åsa (SE); Torbjörn Elfström, Fjärås (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/525,980

(22) PCT Filed: Nov. 13, 2014

(86) PCT No.: PCT/EP2014/074543
§ 371 (c)(1),
(2) Date: May 11, 2017

(87) PCT Pub. No.: WO2016/074736
PCT Pub. Date: May 19, 2016

(65) Prior Publication Data
US 2017/0352946 A1    Dec. 7, 2017

(51) Int. Cl.
*H01Q 1/24* (2006.01)
*H04B 17/14* (2015.01)
*H04B 17/19* (2015.01)
*H04B 17/21* (2015.01)

(52) U.S. Cl.
CPC ............ *H01Q 1/246* (2013.01); *H04B 17/14* (2015.01); *H04B 17/19* (2015.01); *H04B 17/21* (2015.01)

(58) Field of Classification Search
CPC ......... H04B 17/21; H04B 17/19; H04B 17/14

USPC ........................................................ 455/562.1
See application file for complete search history.

(56) References Cited

U.S. PATENT DOCUMENTS

| | | | |
|---|---|---|---|
| 2005/0110677 A1* | 5/2005 | Schipper | G01S 19/26 342/357.63 |
| 2008/0020807 A1* | 1/2008 | Kolano | H04M 1/24 455/569.1 |
| 2009/0262011 A1* | 10/2009 | Calderbank | G01S 7/024 342/188 |
| 2010/0150060 A1* | 6/2010 | Vitek | G01C 9/00 370/328 |
| 2010/0231450 A1 | 9/2010 | Le Sage | |
| 2012/0264473 A1* | 10/2012 | Mujtaba | H04W 68/00 455/515 |

(Continued)

*Primary Examiner* — Raj Chakraborty

(57) ABSTRACT

The present invention relates to a communication node arrangement comprising at least two antenna units. Each antenna unit comprises at least one signal port and at least one antenna element, where each signal port is connected to at least one corresponding antenna element. Each antenna unit comprises at least one sensor unit arranged to sense its orientation relative a predetermined reference extension. The communication node arrangement comprises at least one control unit and is arranged to feed a respective test signal into each of at least two different signal ports. For each such test signal, the communication node arrangement is arranged to receive the test signal via at least one other signal port. The communication node arrangement being arranged to determine relative positions of said antenna units based on the received test signals, and to determine relative orientations of said antenna units based on data received from the sensor units.

29 Claims, 4 Drawing Sheets

(56) References Cited

U.S. PATENT DOCUMENTS

2013/0095875 A1    4/2013  Reuven
2014/0256376 A1*   9/2014  Weissman .............. H04B 17/19
                                                  455/550.1

* cited by examiner

SELF-CONFIGURING COMMUNICATION NODE ARRANGEMENT

TECHNICAL FIELD

The present invention relates to a communication node arrangement that comprises at least two antenna units. Each antenna unit comprises at least one signal port and at least one antenna element, and each signal port is at least indirectly connected to at least one corresponding antenna element.

The present invention also relates to a method for determining relative positions and relative orientations between at least two antenna units, where each antenna unit uses at least one signal port.

BACKGROUND

Advanced base stations can be configured in many ways for optimizing coverage and capacity; base station radio architectures may for example comprise several more or less identical antenna units, i.e. antennas and radio that are placed in one common antenna unit that can be used as a building block. Such an antenna unit may for example be equipped with two separate radios; one for each polarization. Placing many such antenna unit building blocks together can facilitate modular site configuration with scalable properties, and the configuration can be referred to as a base station constellation.

Another issue in cellular networks is when multiple active units are placed high up in a mast, via optical or electrical I/Q-links (also known as CPRI (Common Public Radio Interface) links, while the base band processing is located on ground.

By using antenna units as common building block components, a base station system can be setup with different number of radiating elements for different coverage and capacity scenarios. This building block can then be used to create different types of base stations suitable for different scenarios, such as Wide Area, Medium Range or Local Area. Also the antenna aperture can be designed to fit special coverage scenarios, such as high building, meaning that the antenna aperture can be configured as outspread in horizontal or vertical domain or both. A system is then configured by using one or more antenna units to facilitate MIMO (Multiple Input Multiple Output) and/or cell-specific beam-forming.

Cell-specific beam forming is created by calculating phase and amplitude weight for each radiating element. The location and orientation of each individual antenna element, or at least each antenna unit, is needed by the baseband processing when calculating the array excitation required for cell-specific beam-forming. The relative location of each radiating element can be represented by a position matrix, where each element location (x,y,z) is stored in a common matrix with dimension N×3, where N is the total number of radiating elements in the base station.

The relative location of the antenna units in a base station constellation is relevant as information for baseband processing mentioned above, and also for OSS (Operational Support System). For OSS, the information can be used to visualize how the base station is configured.

In current systems, the location matrix is known by the design, when all radiating elements are included. However, for systems created in a modular fashion using antenna units as building blocks according to the above, the concept requires that the system is configured with correct setup information, where location of each element is available together with orientation of each element with respect to earth gravity.

There is thus a need to find the correct mapping of signals, where the installation maps to baseband ports in an efficient and reliable manner. This need is also relevant for legacy base stations with traditional feeder cables.

SUMMARY

The object of the present invention is to provide means for acquiring data about a base station constellation, where the base station comprises antenna unit building blocks This object is achieved by means of a communication node arrangement that comprises at least two antenna units. Each antenna unit comprises at least one signal port and at least one antenna element, and each signal port is at least indirectly connected to at least one corresponding antenna element. Each antenna unit comprises at least one sensor unit arranged to sense its orientation relative a predetermined reference extension. The communication node arrangement comprises at least one control unit, and is arranged to feed a respective test signal into each of at least two different signal ports. For each such test signal, the communication node arrangement is arranged to receive the test signal via at least one other signal port. The communication node arrangement is arranged to determine relative positions of said antenna units based on the received test signals, and to determine relative orientations of said antenna units based on data received from the sensor units.

This object is achieved by means of a method for determining relative positions and relative orientations between at least two antenna units, where each antenna unit uses at least one signal port. The method comprises the steps:

Feeding a respective test signal into each of at least two different signal ports.

For each such test signal, receiving said test signal via at least one other signal port.

Determining relative positions of said antenna units based on the received test signals.

Determining relative orientations of said antenna units based on data received from sensor units used in each antenna unit for sensing its orientation relative a predetermined reference extension.

According to an example, the communication node arrangement is arranged to feed a respective test signal into one signal port at a time.

According to another example, the control unit is arranged to form a scattering matrix from the received test signals, and to extract a positioning matrix from the scattering matrix. The positioning matrix comprises the relative positions of said antenna units.

According to another example, the control unit is arranged to control at least one ventilation arrangement in dependence of said determined relative positions and said determined relative orientations.

According to another example, at least one antenna unit comprises at least one transceiver arrangement, and each signal port of said at least one antenna unit is arranged to transmit and receive digital baseband signals. For each of said at least one antenna unit, the communication node arrangement may for example be arranged to feed a respective test signal to each of at least two different antenna elements via a corresponding signal port. For each such test signal, the communication node arrangement is arranged to receive the test signal from at least one other antenna element via a corresponding signal port. The communication node arrangement is then arranged to determine relative positions of said antenna elements based on the received test signals, and to determine relative orientations of said antenna elements based on data received from the sensor units.

According to another example, at least one antenna unit is connected to at least one transceiver arrangement, where each signal port of such an antenna unit is arranged to transmit and receive RF (radio frequency) signals.

According to another example, the communication node arrangement comprises at least one baseband processing unit. Each such baseband processing unit comprises a first set of ports and a second set of ports, and is arranged to connect at least two first set ports, comprised in the first set of ports, to at least two second set ports, comprised in the second set of ports, in dependence of the acquired data. Each port in the first set of ports is at least indirectly connected to a signal port.

According to another example, the control unit is arranged to detect to which signal ports the first set of ports at least indirectly are connected.

According to another example, the control unit is arranged to combine said determined relative positions and said determined relative orientations to form a total matrix. The control unit is further arranged to compare the total matrix with a set of predefined antenna matrixes and to choose the predefined antenna matrix that best corresponds to the total matrix.

Other examples are evident from the dependent claims.

A number of advantages are obtained by means of the present invention, for example:
providing an auto- and re-configurable node arrangement; and
enabling mapping of the correct antenna unit to the right base band port. This will reduce site deployment time and minimize the risk to introduce errors caused by connecting or placing parts wrongly.

BRIEF DESCRIPTION OF THE DRAWINGS

The present invention will now be described more in detail with reference to the appended drawings, where.

DETAILED DESCRIPTION

Figure 1:
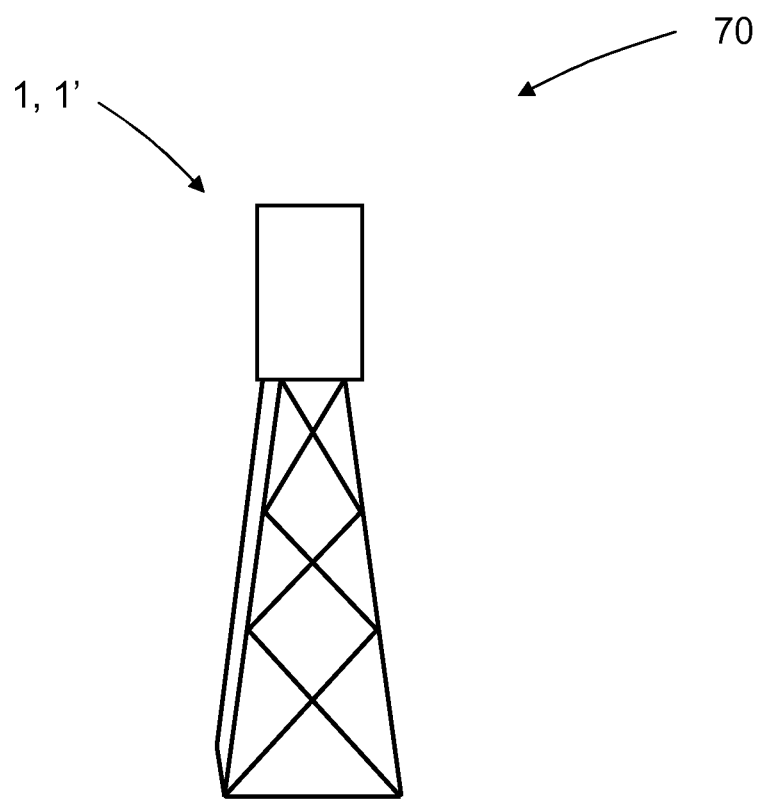
FIG. 1 shows a schematic perspective view of communication node arrangement.
Figure 2:
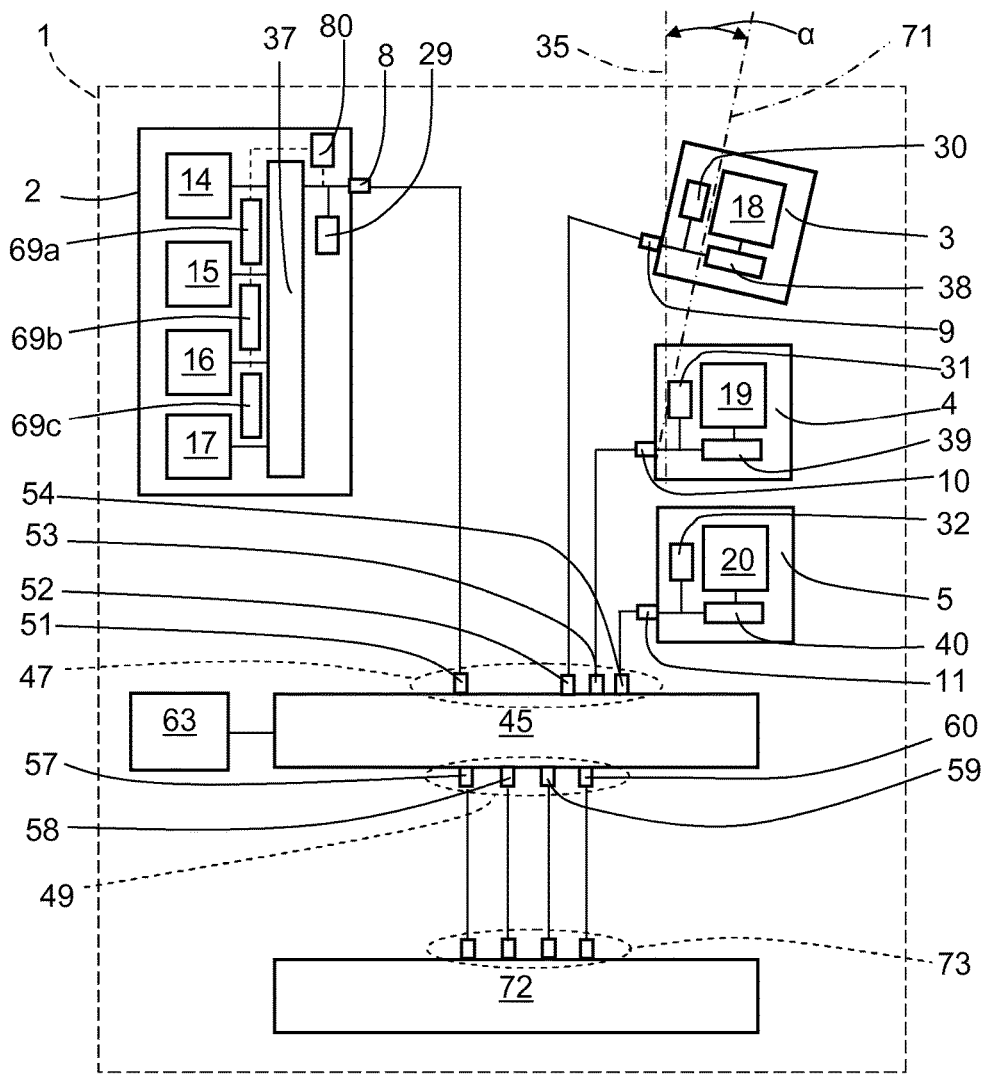
FIG. 2 shows a schematic view of a first example of a communication node arrangement.

With reference to FIG. 1, there is a communication node arrangement 1 schematically indicated in a wireless communication network 70. With reference to FIG. 2, showing a first example, the communication node arrangement 1 comprises a modular configuration with a first antenna unit 2, a second antenna unit 3, a third antenna unit 4 and a fourth antenna unit 5.

Each antenna unit 2, 3, 4, 5 comprises a corresponding first signal port 8, second signal port 9, third signal port 10 and fourth signal port 11 and a corresponding first sensor unit 29, second sensor unit 30, third sensor unit 31 and fourth sensor unit 32, where each sensor unit 29, 30, 31, 32 is arranged to sense its orientation relative a predetermined reference extension 35, in this example a vertical extension. Here, the second antenna unit 3 is mounted such that a reference extension 71 that extends along a longitudinal extension of the second antenna unit 3 presents an angle $\alpha$ to the vertical extension 35. Orientations in the form of deviations from the vertical extension 35 in other planes are of course detected as well.

The first antenna unit 2 comprises a first antenna element 14, a second antenna element 15, a third antenna element 16, a fourth antenna element 17 and a first transceiver arrangement 37. The first signal port 8 is connected to these antenna elements 14, 15, 16, 17 via the first transceiver arrangement 37.

Correspondingly, the second antenna unit 3 comprises a fifth antenna element 18 and a second transceiver arrangement 38, where the second signal port 9 is connected to the fifth antenna element 18 via the second transceiver arrangement 38. Furthermore, the third antenna unit 4 comprises a sixth antenna element 19 and a third transceiver arrangement 39, where the third signal port 10 is connected to the sixth antenna element 19 via the third transceiver arrangement 39. Finally, the fourth antenna unit 5 comprises a seventh antenna element 20 and a fourth transceiver arrangement 40, where the fourth signal port 11 is connected to the seventh antenna element 20 via the fourth transceiver arrangement 40.

The communication node arrangement 1 further comprises a control unit 63 and a baseband processing unit 45, where the baseband processing unit 45 comprises a first set of ports 47 and a second set of ports 49. The first set of ports 47 comprises four first set ports 51, 52, 53, 54 of which a first port 51 is connected to the first signal port 8, a second port 52 is connected to the second signal port 9, a third port 53 is connected to the third signal port 10 and a fourth port 54 is connected to the fourth signal port 11.

The second set of ports 49 comprises four second set ports 57, 58, 59, 60 which are connected to a base band radio arrangement 72 via a set of base band radio ports 73. The baseband processing unit 45 is arranged to perform mapping between the first set of ports 47 and the second set of ports 49 such that the first set ports 51, 52, 53, 54 are connected to suitable second set ports 57, 58, 59, 60.

The communication node arrangement 1 is arranged to feed a first transmitted test signal into the first signal port 8, and to receive a corresponding first received test signal via the other signal ports 9, 10, 11. The communication node arrangement 1 is arranged to repeat this for every signal port, i.e. feed a transmitted test signal into one signal port, and to receive a corresponding received test signal via the other signal ports, one at a time.

Based on the received test signals, the communication node arrangement 1 is arranged to determine the relative positions of the antenna units 2, 3, 4, 5, and to also determine relative orientations of the antenna units 2, 3, 4, 5 based on data received from the sensor units 29, 30, 31, 32.

For the first antenna unit 2, there is one transceiver arrangement 37 connected to four separate antenna elements 14, 15, 16, 17. That means that, depending on the properties of the first transceiver arrangement, the relative positions of the individual antenna elements may be obtained. If the first transceiver arrangement 37 is not able to separate between signals to and from the four antenna elements 14, 15, 16, 17, only the relative position of the first antenna unit 2 is obtained as mentioned above.

But if the first transceiver arrangement 37 is arranged to separate between signals to and from the four antenna elements 14, 15, 16, 17, the communication node arrangement 1 is arranged to feed a first transmitted test signal into the first antenna element 14, and to receive a corresponding first received test signal from the other antenna elements 15, 16, 17 via the first signal port 8, and from the other antenna elements 18, 19, 20 via the other signal ports 9, 10, 11.

Then, since the other antenna units 3, 4, 5 in this example only comprise one antenna element 18, 19, 20 each, the communication node arrangement 1 is arranged to feed a transmitted test signal into one antenna element at a time and to receive a corresponding first received test signal from all the other antenna elements at a time, and to repeat this for all antenna elements. In this manner, the relative positions of all individual antenna elements 14, 15, 16, 17; 18, 19, 20 will be obtained.

Antenna elements couple to each other by a factor that is proportional to the mutual orientation and distance between each other as well as the size and shape of the antenna element. By injecting power in to one antenna or antenna element at a time and measure the power and phase of the coupled signal in all the other antennas or antenna elements, the coupling factor between each antenna pair or antenna element pair is determined.

In a second example that will be discussed later, other types of antennas and signal ports will be disclosed.

The acquired data may be used for several purposes, for example:

The baseband processing unit 45 is arranged to perform port mapping, connecting the first set ports 51, 52, 53, 54 to the second set ports 57, 58, 59, 60 in dependence of the acquired data. In this way, erroneously connections are compensated for.

Knowledge about the position of each individual antenna element is necessary if beam-forming with controlled characteristics in terms of side lobe suppression and EIRP/EIS (Equivalent Isotropically Radiated Power/Effective Isotropic Sensitivity) is the goal.

Further, as indicated for the first antenna unit 2, there is a plurality of ventilation arrangement 69a, 69b, 69c, suitably fans, which are controllable. The acquired data that provide knowledge regarding relative position and orientation of the first antenna unit 2 is then used for controlling the fans 69a, 69b, 69c such that an optimal cooling is obtained for the first antenna unit. Although not shown, similar ventilation arrangements may be used for the other antenna units 3, 4, 5 as well. Controlling the fans may comprise regulating rotational direction and speed. It is also conceivable that the fans may be tilted by means of servo motors or similar.

In order to obtain the relative positions according to the above, the control unit 63 is arranged to form a scattering matrix S from the received test signals, and to extract a positioning matrix R from the scattering matrix S. The positioning matrix R comprises the relative positions of said antenna units 2, 3, 4, 5 and/or antenna elements, and can be described as:

$$R = \begin{bmatrix} 0 & y_1 & z_1 \\ 0 & y_2 & z_2 \\ \vdots & \vdots & \vdots \\ 0 & y_N & z_N \end{bmatrix},$$

where $y_n$ and $z_n$ relate to coordinate positions. The zeros in the leftmost column of R means that all antenna units 2, 3, 4, 5 and/or antenna elements lie in the same plane; in the general case the leftmost column of R could comprise a plurality of different x-values $x_1, x_2 \ldots x_N$.

The scattering matrix S can be described as:

$$S = \begin{bmatrix} s_{11} & s_{12} & \cdots & s_{1N} \\ s_{21} & s_{22} & \cdots & s_{2N} \\ \vdots & \vdots & \ddots & \vdots \\ s_{N1} & s_{N2} & \cdots & s_{NN} \end{bmatrix}.$$

The diagonal of the scattering matrix is not of interest, since the diagonal hold information about the matching. The other matrix elements hold information about the mutual coupling. The mutual coupling can be determined by sending test signals while measurement of all combinations of mutual coupling is conducted.

An orientation matrix O is formed as:

$$O = [\alpha_1 \alpha_1 \ldots \alpha_N].$$

The orientation matrix O comprises the relative orientations of the antenna units 2, 3, 4, 5.

In the following, three different examples of ways for extracting the position matrix R from the scattering matrix S will be described.

According to a first example for extracting the position matrix R, the control unit 63 is arranged to extract a positioning matrix R from the scattering matrix S by comparing the scattering matrix with a set of predefined scattering matrixes with corresponding positioning matrixes. Then, the predefined scattering matrix and corresponding positioning matrix that best matches the scattering matrix S formed from the received test signals is chosen.

According to a second example for extracting the position matrix R, the control unit 63 is arranged to extract a positioning matrix R from the scattering matrix S by determining transmission properties from comparisons between amplitude and phase of transmitted test signals, as well as amplitude and phase of received test signals. Based on these comparisons, distances between transmitting antenna units and receiving antenna units are determined.

According to a third example for extracting the position matrix R, each test signal comprises a previously known data sequence. The control unit 63 is arranged to extract a positioning matrix R from the scattering matrix S based on a correlation of all transmitted test signals with all received test signals, and detected time differences between transmitted test signals and received test signals.

Figure 3:
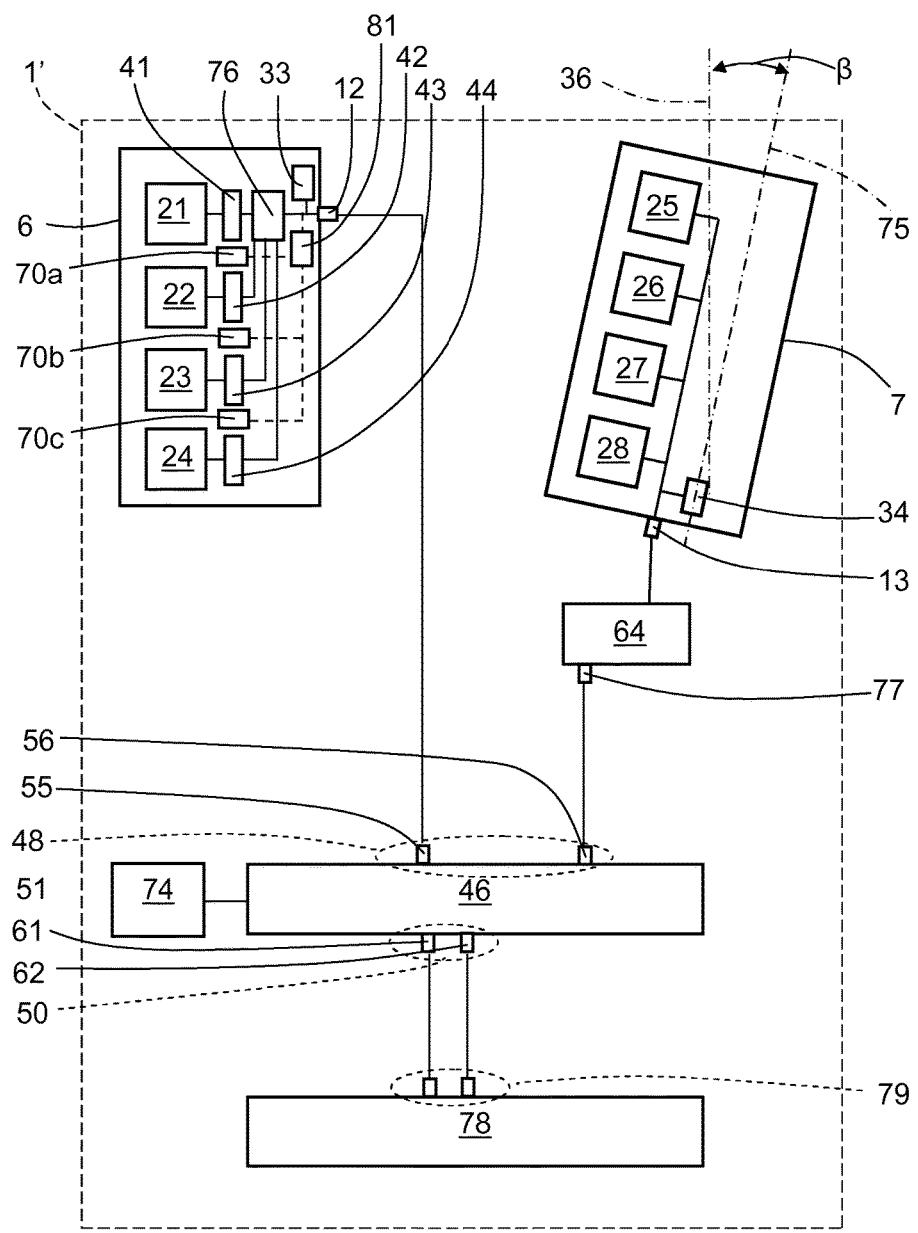
FIG. 3 shows a schematic view of a second example of a communication node arrangement.

A second example of a communication node arrangement 1' will now be described with reference to FIG. 3.

The communication node arrangement 1' comprises a first antenna unit 6 and a second antenna unit 7. Each antenna unit 6, 7 comprises a corresponding first signal port 12 and second signal port 13, as well as a corresponding first sensor unit 33 and a second sensor unit 34, where each sensor unit 33, 34 is arranged to sense its orientation relative a predetermined reference extension 36, in this example a vertical extension. Here, the second antenna unit 7 is mounted such that a reference extension 75 that extends along a longitudinal extension of the second antenna unit 7 presents an angle β to the vertical extension 36. Orientations in the form of deviations from the vertical extension 36 in other planes are of course detected as well.

The first antenna unit 6 comprises a first antenna element 21, a second antenna element 22, a third antenna element 23 and a fourth antenna element 24. The first antenna unit 6 comprises a first transceiver arrangement 41 that is connected to the first antenna element 21, a second transceiver arrangement 42 that is connected to the second antenna element 22, a third transceiver arrangement 43 that is connected to the third antenna element 23 and a fourth transceiver arrangement 44 that is connected to the fourth antenna element 24. The first signal port 12 is connected to the transceiver arrangements 41, 42, 43, 44 via a signal divider/combiner 76.

The second antenna unit 7 comprises a first antenna element 25, a second antenna element 26, a third antenna element 27 and a fourth antenna element 28. The antenna elements 25, 26, 27, 28 are connected directly to the second signal port 13, suitably via a distribution network. The second signal port 13 is connected to a fifth transceiver arrangement 64 that is external with reference to the second antenna unit 7, and has a transceiver port 77. The second signal port 13 is arranged to transmit and receive RF (radio frequency) signals.

The communication node arrangement 1' further comprises a control unit 69 and a baseband processing unit 46, where the baseband processing unit 46 comprises a first set of ports 48 and a second set of ports 50. The first set of ports 48 comprises two first set ports 55, 56 of which a first port 55 is connected to the first signal port 12 and a second port 56 is connected to the transceiver port 77.

The second set of ports 50 comprises two second set ports 61, 62 which are connected to a base band radio arrangement 78 via a set of base band radio ports 79. The baseband processing unit 46 is arranged to perform mapping between the first set of ports 48 and the second set of ports 50 such that the first set ports 55, 56 are connected to suitable second set ports 61, 62.

For the first antenna unit 6, the communication node arrangement 1' is arranged to feed a first transmitted test signal into the first antenna element 21, and to receive a corresponding first received test signal from the other antenna elements 22, 23, 24 via the first signal port 8, and from the other antenna elements 25, 26, 27, 28 via the second signal ports 13 and the transceiver port 77. This is repeated for the antenna elements 21, 22, 23, 24 of the first antenna unit 6, one at time, with a corresponding second transmitted test signal, third transmitted test signal and fourth transmitted test signal.

For the second antenna unit 7 it is not possible to distinguish between separate antenna elements, and here the communication node arrangement 1' is arranged to feed a fifth transmitted test signal into the second signal port 13 via the transceiver port 77, and to re receive a corresponding fifth received test signal from the antenna elements 22, 23, 24 of the first antenna unit 6 via the first signal port 8.

For the first antenna unit 6, it is possible to determine the relative positions of all individual antenna elements 21, 22, 23, 24, and for the second antenna unit 7 is possible to determine the relative position of the antenna unit 7 itself, but not of the individual antenna elements 25, 26, 27, 28. An orientation matrix O is formed as in the first example, and comprises the relative orientations of the antenna units 6, 7.

As in the first example, a scattering matrix S, a positioning matrix R and a total matrix Z are determined. The matrixes may be used for the same purposes as in the first example.

For both examples, and generally, the positioning matrix R has been described to comprise the relative positions acquired from the described consecutive transmission and reception of test signals. However, in order to be able to perform beam-forming and control of ventilation arrangements as mentioned previously, the orientation data of the orientation matrix O is needed as well. Therefore, the orientation matrix O and the positioning matrix R are combined to form a total matrix Z. By means of the total matrix Z, it is possible to calculate the correct antenna excitation for a desired beamforming, such as for example beam steering and beam shaping.

Furthermore, by comparing the total matrix Z with a set of predefined antenna matrixes, it is possible to choose the predefined antenna matrix that best corresponds to the total matrix Z, and then determine an estimated antenna configuration.

It is thus possible to determine the orientation and relative position of the antennas, or integrated base stations, in a cellular site by using the fact that there is a coupling factor between antennas and by using an accelerometer or a gyro, enabling a base station or other node arrangement to be self- or re-configurable.

Having the position matrix of the antenna elements, each antenna unit may be mapped to the correct base band radio ports 73, 79. This can be used in installation of cellular networks as well as legacy base stations with traditional feeder cables, using for example TDD (Time Division Duplex) technology. For an FDD (Frequency Division Duplex) system a detector should be added in each receiver branch, enabling detection of coupled energy in the respective transmitter frequency band.

Furthermore, by means of the total matrix Z, the cooling capacity of a node arrangement can be better estimated and optimized, as well as energy consumption optimized. This since there is a dependence of the orientation of cooling flanges vs. cooling capacity and that there is a possibility to control rotation of fans, securing that cooling air flow upwards, in harmony with the laws of thermodynamics. Also, cooling capacity and energy consumption can be further optimized considering orientation and location of radio units in relation to each other, securing that warm air flow from one radio core is re-used to a minimum in another radio unit.

The orientation sensor units 29, 30, 31, 32; 33, 34 are connected to the control unit 63, 69 in any suitable way, in the drawings they are connected to the respective signal port. For the case where the antenna units 2, 3, 4, 5; 6 comprise at least one transceiver arrangement 37; 38, 39, 40; 41, 42, 43, 44, a CPRI (Common Public Radio Interface) may be used for communication, and the case where a transceiver unit 64 is external with respect to the antenna unit 7, an AISG (Antenna Interface Standards Group) protocol may be used. It is also possible that the orientation sensor units 29, 30, 31, 32; 33, 34 are controlled separately, either via a wireless link or via a wired connection.

The ventilation arrangements 69a, 69b, 69c; 70a, 70b, 70c are connected to a power supply 80, 81 that may be controllable and connected to the control unit 63, 69 in the same way as the orientation sensor units 29, 30, 31, 32; 33, 34. Each power supply 80, 81 is connected to ventilation arrangements 69a, 69b, 69c; 70a, 70b, 70c via a suitable power bus connection, indicated with dashed lines in FIG. 2 and FIG. 3.

The deployment can be simplified by using this self-configuring approach for active antenna arrays, where the base station by itself determines the individual location of the radiating elements, where applicable.

The array geometry can be configured manually or detected automatically. By using specific patterns of test signals to be applied just after site deployment, the node arrangement can discover and auto-configure itself, by determining the location of each radiating element, where applicable.

Figure 4:
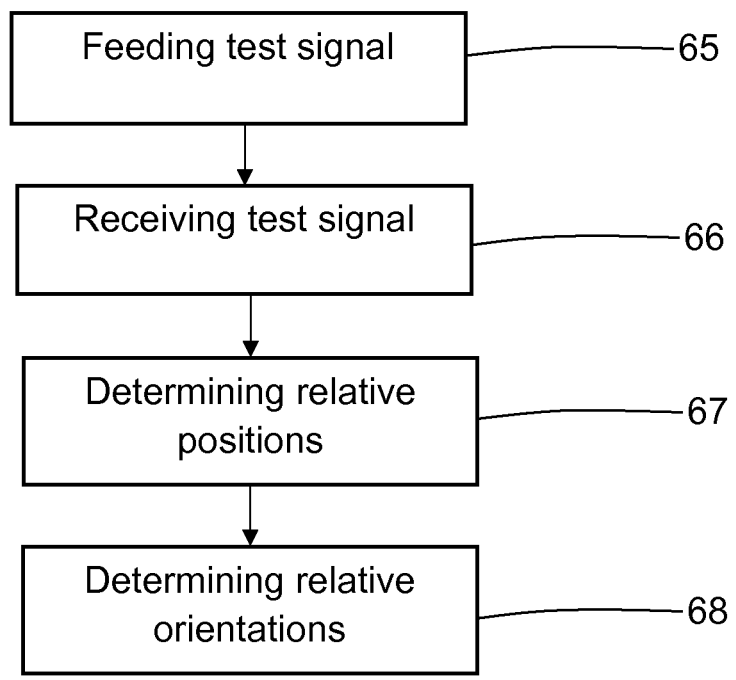
FIG. 4 shows a flowchart of a method for determining relative positions and relative orientations between at least two antenna units in a communication node arrangement.

With reference to FIG. 4, the present disclosure also relates to a method for determining relative positions and relative orientations between at least two antenna units 2, 3, 4, 5; 6, 7. Each antenna unit 2, 3, 4, 5; 6, 7 uses at least one signal port 8, 9, 10, 11; 12, 13, wherein the method comprises the steps:

65: Feeding a respective test signal into each of at least two different signal ports 8, 9, 10, 11; 12, 13.

66: For each such test signal, receiving said test signal via at least one other signal port.

67: Determining relative positions of said antenna units 2, 3, 4, 5; 6, 7 based on the received test signals.

68: Determining relative orientations of said antenna units 2, 3, 4, 5; 6, 7 based on data received from sensor units 29, 30, 31, 32; 33, 34 used in each antenna unit 2, 3, 4, 5; 6, 7 for sensing its orientation relative a predetermined reference extension 35, 36.

The present disclosure is not limited to the above example, but may vary freely within the scoop of the appended claims. For example, it is not necessary to feed signal into signal ports and/or antenna elements one at a time, depending of type of test signal it is possible to send test signals and receive test signal at many, or all, signal ports and/or antenna elements at the same time.

A communication node arrangement 1, 1' comprises at least two antenna units 2, 3, 4, 5; 6, 7, and each antenna unit 2, 3, 4, 5; 6, 7 comprises at least one signal port 8, 9, 10, 11; 12, 13 and at least one antenna element 14, 15, 16, 17; 18, 19, 20; 21, 22, 23, 24; 25, 26, 27, 28. Each signal port is at least indirectly connected to at least one corresponding antenna element; this means that for some examples there is one or more components connected between a signal port and a corresponding antenna element, such as for example a transceiver arrangement 37; 38, 39, 40; 41, 42, 43, 44.

For the case where the antenna units 2, 3, 4, 5; 6 comprise at least one transceiver arrangement 37; 38, 39, 40; 41, 42, 43, 44, the corresponding signal ports 8, 9, 10, 11; 12 are suitably arranged to transmit and receive digital baseband signals. The connections may be in the form of copper or fibre, in the latter case the digital baseband signals are transferred optically in fibre cables.

The present disclosure may be implemented for different radio system technologies, such as for example the previously mentioned TDD and FDD.

The examples shown are only for conveying an understanding of the present disclosure; naturally the number of antenna units and number of antenna elements in each antenna units may vary. A plurality of arrays of antenna units with integrated transceiver units may for example be positioned at different locations in a neighbourhood, and then all control of the antenna units, baseband processing and baseband radio management may completely or partly be performed in a central location that may be remote with respect to the neighbourhood.

In the examples described, the communication node arrangement 1, 1' has been shown to comprise one control unit 63, 74. The number of control units and their exact locations may of course vary, the examples schematically disclosing one possible example.

The test signal is for example at least one of a single CW (continuous wave), a modulated UTRA (UMTS (Universal Mobile Telecommunications System) Terrestrial Radio Access) signal, an E-UTRA (Evolved UMTS Terrestrial Radio Access) signal, or a signal with correlation properties for calculating time difference.

All or some antenna units may be single polarized or dual polarized.

Generally, the present disclosure relates to a communication node arrangement 1, 1' comprising at least two antenna units 2, 3, 4, 5; 6, 7. Each antenna unit 2, 3, 4, 5; 6, 7 comprises at least one signal port 8, 9, 10, 11; 12, 13 and at least one antenna element 14, 15, 16, 17; 18, 19, 20; 21, 22, 23, 24; 25, 26, 27, 28, where each signal port at least indirectly is connected to at least one corresponding antenna element 14, 15, 16, 17; 18, 19, 20; 21, 22, 23, 24; 25, 26, 27, 28. Each antenna unit 2, 3, 4, 5; 6, 7 comprises at least one sensor unit 29, 30, 31, 32; 33, 34 arranged to sense its orientation relative a predetermined reference extension 35, 36. The communication node arrangement 1, 1' comprises at least one control unit 63, 74, and is arranged to feed a respective test signal into each of at least two different signal ports 8, 9, 10, 11; 12, 13. For each such test signal, the communication node arrangement 1, 1' is arranged to receive the test signal via at least one other signal port. The communication node arrangement 1, 1' is arranged to determine relative positions of said antenna units 2, 3, 4, 5; 6, 7 based on the received test signals, and to determine relative orientations of said antenna units 2, 3, 4, 5; 6, 7 based on data received from the sensor units 29, 30, 31, 32; 33, 34.

According to an example, the communication node arrangement 1, 1' may be arranged to feed a respective test signal into one signal port 8, 9, 10, 11; 12, 13 at a time.

According to another example, said control unit 63, 74 may be arranged to form a scattering matrix S from the received test signals, and to extract a positioning matrix R from the scattering matrix S. The positioning matrix R comprises the relative positions of said antenna units 2, 3, 4, 5; 6, 7.

Said control unit 63, 74 may be arranged to extract a positioning matrix R from the scattering matrix S by comparing the scattering matrix with a set of predefined scattering matrixes with corresponding positioning matrixes, and then choose the predefined scattering matrix and corresponding positioning matrix that best matches the scattering matrix S formed from the received test signals.

Alternatively, said control unit 63, 74 may be arranged to extract a positioning matrix R from the scattering matrix S by determining transmission properties from comparisons between amplitude and phase of transmitted test signals as well as amplitude and phase of received test signals, and by determining distances between transmitting antenna units and receiving antenna units based on said comparisons.

Alternatively, each test signal may comprise a previously known data sequence, and said control unit 63, 74 may be arranged to extract a positioning matrix R from the scattering matrix S based on a correlation of all transmitted test signals with all received test signals, and detected time differences between transmitted test signals and received test signals.

According to another example, said control unit 63, 74 may be arranged to control at least one ventilation arrangement 69a, 69b, 69c; 70a, 70b, 70c in dependence of said determined relative positions and said determined relative orientations.

According to another example, at least one antenna unit 2, 3, 4, 5; 6 may comprise at least one transceiver arrangement 37; 38, 39, 40; 41, 42, 43, 44, where each signal port 8, 9, 10, 11; 12 of said at least one antenna unit 2, 3, 4, 5; 6 then is arranged to transmit and receive digital baseband signals. For at least one antenna unit 3, 4, 5; 6, a separate transceiver arrangement 38, 39, 40; 41, 42, 43, 44 may be connected to each antenna element 18, 19, 20; 21, 22, 23, 24.

For each of said at least one antenna unit 2; 3, 4, 5; 6, the communication node arrangement 1, 1' may be arranged to feed a respective test signal to each of at least two different antenna elements 14, 15, 16, 17; 18, 19, 20; 21, 22, 23, 24 via a corresponding signal port 8, 9, 10, 11; 12. For each such test signal, the communication node arrangement 1, 1' is then arranged to receive the test signal from at least one other antenna element via a corresponding signal port 8, 9, 10, 11; 12. The communication node arrangement 1, 1' is then further arranged to determine relative positions of said antenna elements 14, 15, 16, 17; 18, 19, 20; 21, 22, 23, 24 based on the received test signals, and to determine relative orientations of said antenna elements 14, 15, 16, 17; 18, 19, 20; 21, 22, 23, 24 based on data received from the sensor units 29, 30, 31, 32; 33, 34.

According to another example, at least one antenna unit 7 is connected to at least one transceiver arrangement 64, where each signal port 13 of said at least one antenna unit 6 is arranged to transmit and receive RF (radio frequency) signals.

According to another example, the communication node arrangement 1, 1' may comprise at least one baseband processing unit 45, 46, where each of said at least one baseband processing unit 45, 46 comprises a first set of ports 47, 48 and a second set of ports 49, 50. The communication node arrangement 1, 1' is then arranged to connect at least two first set ports 51, 52, 53, 54; 55, 56, comprised in the first set of ports 47, 48, to at least two second set ports 57, 58, 59, 60; 61 62, comprised in the second set of ports 49, 50, in dependence of the acquired data, where each port in the first set of ports 47, 48 at least indirectly is connected to a signal port 8, 9, 10, 11; 12, 13. Said control unit 63, 74 may be arranged to detect to which signal ports the first set of ports 47, 48 at least indirectly are connected.

According to another example, the test signal may be modulated signal.

According to another example, the test signal may be at least one of a single CW (continuous wave), a modulated UTRA (UMTS (Universal Mobile Telecommunications System) Terrestrial Radio Access) signal, an E-UTRA (Evolved UMTS Terrestrial Radio Access) signal, or a signal with correlation properties for calculating time difference.

According to another example, said control unit 63, 74 may be arranged to combine said determined relative positions and said determined relative orientations to form a total matrix Z, where said control unit 63, 74 is arranged to compare the total matrix Z with a set of predefined antenna matrixes and to choose the predefined antenna matrix that best corresponds to the total matrix Z.

Generally, the present disclosure also relates to a method for determining relative positions and relative orientations between at least two antenna units 2, 3, 4, 5; 6, 7, where each antenna unit 2, 3, 4, 5; 6, 7 uses at least one signal port 8, 9, 10, 11; 12, 13. The method comprises the steps:
65: feeding a respective test signal into each of at least two different signal ports 8, 9, 10, 11; 12, 13;
66: for each such test signal, receiving said test signal via at least one other signal port;
67: determining relative positions of said antenna units 2, 3, 4, 5; 6, 7 based on the received test signals; and
68: determining relative orientations of said antenna units 2, 3, 4, 5; 6, 7 based on data received from sensor units 29, 30, 31, 32; 33, 34 used in each antenna unit 2, 3, 4, 5; 6, 7 for sensing its orientation relative a predetermined reference extension 35, 36.

According to an example, the method comprises the step of feeding a respective test signal into one signal port 8, 9, 10, 11; 12, 13 at a time.

According to another example, the method comprises the steps of forming a scattering matrix S from the received test signals, and extracting a positioning matrix R from the scattering matrix S, where the positioning matrix R comprises the relative positions of said antenna units 2, 3, 4, 5; 6, 7.

According to another example, the step of extracting a positioning matrix R from the scattering matrix S may comprise comparing the scattering matrix with a set of predefined scattering matrixes with corresponding positioning matrixes, and choosing the predefined scattering matrix and corresponding positioning matrix that best matches the scattering matrix S formed from the received test signals.

Alternatively, the step of extracting a positioning matrix R from the scattering matrix S may comprise determining transmission properties from comparisons between amplitude and phase of transmitted test signals as well as amplitude and phase of received test signals, and determining distances between transmitting antenna units and receiving antenna units based on said comparisons.

Alternatively, the step of extracting a positioning matrix R from the scattering matrix S may comprise using a previously known data sequence for each test signal, and extracting a positioning matrix R from the scattering matrix S by correlating all transmitted test signals with all received test signals, and using detected time differences between transmitted test signals and received test signals.

According to another example, said determined relative positions and said determined relative orientations may be used when controlling at least one ventilation arrangement 69a, 69b, 69c; 70a, 70b, 70c.

According to another example, each signal port 8, 9, 10, 11; 12 of at least one antenna unit 2, 3, 4, 5; 6 is used for transmitting and receiving digital baseband signals. For each of said at least one antenna unit 2; 3, 4, 5; 6, the method may comprise the steps of:
feeding a respective test signal to each of at least two different antenna elements 14, 15, 16, 17; 18, 19, 20; 21, 22, 23, 24 via corresponding signal ports 8, 9, 10, 11; 12;
for each such test signal, receiving the test signal from at least one other antenna element via a corresponding signal port 8, 9, 10, 11; 12;
determining relative positions of said antenna elements 14, 15, 16, 17; 18, 19, 20; 21, 22, 23, 24 based on the received test signals, and
determining relative orientations of said antenna elements 14, 15, 16, 17; 18, 19, 20; 21, 22, 23, 24 based on data received from the sensor units 29, 30, 31, 32; 33, 34.

According to another example, at least one signal port 12 is used for transmitting and receiving RF, radio frequency, signals.

According to another example, at least two first set ports 51, 52, 53, 54; 55, 56, in a first set of ports 47, 48, are connected to at least two second set ports 57, 58, 59, 60; 61 62, in a second set of ports 49, 50, in dependence of the determined relative positions and relative orientations, where each port in the first set of ports 47, 48 at least indirectly is connected to a signal port 8, 9, 10, 11; 12, 13.

According to another example, the method comprises detecting to which signal ports the first set of ports 47, 48 at least indirectly are connected.

According to another example, a modulated signal is used as test signal.

According to another example, at least one of a single CW (continuous wave), a modulated UTRA (UMTS (Universal Mobile Telecommunications System) Terrestrial Radio Access) signal, an E-UTRA (Evolved UMTS Terrestrial Radio Access) signal, or a signal with correlation properties for calculating time difference is used as test signal.

According to another example, the method comprises the steps of combining said determined relative positions and said determined relative orientations to form a total matrix Z, comparing the total matrix Z with a set of predefined antenna matrixes and choosing the predefined antenna matrix that best corresponds to the total matrix Z.

The invention claimed is:

1. A communication node arrangement comprising:
   at least two antenna units, where each antenna unit comprises at least one signal port and at least one antenna element, each signal port being at least indirectly connected to at least one corresponding antenna element,
      wherein each antenna unit comprises at least one sensor unit arranged to sense its orientation relative a predetermined reference extension;
   at least one control unit arranged to feed a respective test signal into each of at least two different signal ports,
      wherein for each such test signal, the communication node arrangement is arranged to receive the test signal via at least one other signal port, and the communication node arrangement is arranged to determine relative positions of said antenna units based on the received test signals, and to determine relative orientations of said antenna units based on data received from the sensor units, and
      wherein said control unit is arranged to control at least one ventilation arrangement in dependence of said determined relative positions and said determined relative orientations.

2. A communication node arrangement according to claim 1, wherein the communication node arrangement is arranged to feed a respective test signal into one signal port at a time.

3. A communication node arrangement according to claim 1, wherein said control unit is arranged to form a scattering matrix from the received test signals, and to extract a positioning matrix from the scattering matrix, where the positioning matrix comprises the relative positions of said antenna units.

4. A communication node arrangement according to claim 3, wherein said control unit is arranged to extract a positioning matrix from the scattering matrix by comparing the scattering matrix with a set of predefined scattering matrixes with corresponding positioning matrixes, and then choose the predefined scattering matrix and corresponding positioning matrix that best matches the scattering matrix formed from the received test signals.

5. A communication node arrangement according to claim 3, wherein said control unit is arranged to extract a positioning matrix from the scattering matrix by determining transmission properties from comparisons between amplitude and phase of transmitted test signals as well as amplitude and phase of received test signals, and by determining distances between transmitting antenna units and receiving antenna units based on said comparisons.

6. A communication node arrangement according to claim 3, wherein each test signal comprises a previously known data sequence, and wherein said control unit is arranged to extract a positioning matrix from the scattering matrix based on a correlation of all transmitted test signals with all received test signals, and detected time differences between transmitted test signals and received test signals.

7. A communication node arrangement according to claim 1, wherein at least one antenna unit comprises at least one transceiver arrangement, where each signal port of said at least one antenna unit is arranged to transmit and receive digital baseband signals.

8. A communication node arrangement according to claim 7, wherein, for at least one antenna unit, a separate transceiver arrangement is connected to each antenna element.

9. A communication node arrangement according to claim 7, wherein, for each of said at least one antenna unit, the communication node arrangement is arranged to feed a respective test signal to each of at least two different antenna elements via a corresponding signal port, and for each such test signal the communication node arrangement is arranged to receive the test signal from at least one other antenna element via a corresponding signal port, where the communication node arrangement further is arranged to determine relative positions of said antenna elements based on the received test signals, and to determine relative orientations of said antenna elements based on data received from the sensor units.

10. A communication node arrangement according to claim 1, wherein at least one antenna unit is connected to at least one transceiver arrangement, where each signal port of said at least one antenna unit is arranged to transmit and receive RF, radio frequency, signals.

11. A communication node arrangement according to claim 1, wherein the communication node arrangement comprises at least one baseband processing unit, where each of said at least one baseband processing unit comprises a first set of ports and a second set of ports, and is arranged to connect at least two first set ports, comprised in the first set of ports, to at least two second set ports, comprised in the second set of ports, in dependence of the acquired data, where each port in the first set of ports at least indirectly is connected to a signal.

12. A communication node arrangement according to claim 11, wherein said control unit is arranged to detect to which signal ports the first set of ports at least indirectly are connected.

13. A communication node arrangement according to claim 1, wherein the test signal is modulated signal.

14. A communication node arrangement according to claim 1, wherein the test signal is at least one of a single CW, continuous wave, a modulated UTRA, UMTS, Universal Mobile Telecommunications System, Terrestrial Radio Access, signal, an E-UTRA, Evolved UMTS Terrestrial Radio Access, signal, or a signal with correlation properties for calculating time difference.

15. A communication node arrangement according to claim 1, wherein said control unit is arranged to combine said determined relative positions and said determined relative orientations to form a total matrix, where said control unit is arranged to compare the total matrix with a set of predefined antenna matrixes and to choose the predefined antenna matrix that best corresponds to the total matrix.

16. A method for determining relative positions and relative orientations between at least two antenna units, where each antenna unit uses at least one signal port, wherein the method comprises:
   feeding a respective test signal into each of at least two different signal;
   for each such test signal, receiving said test signal via at least one other signal port;
   determining relative positions of said antenna units based on the received test signals; and
   determining relative orientations of said antenna units based on data received from sensor units used in each antenna unit for sensing its orientation relative a predetermined reference extension, wherein said determined relative positions and said determined relative orientations are used when controlling at least one ventilation arrangement.

17. A method according to claim 16, wherein the method comprises feeding a respective test signal into one signal port at a time.

18. A method according to claim 16, wherein the method comprises forming a scattering matrix from the received test signals, and extracting a positioning matrix from the scattering matrix, where the positioning matrix comprises the relative positions of said antenna units.

19. A method according to claim 18, wherein the step of extracting a positioning matrix from the scattering matrix comprises comparing the scattering matrix with a set of predefined scattering matrixes with corresponding positioning matrixes, and choosing the predefined scattering matrix and corresponding positioning matrix that best matches the scattering matrix formed from the received test signals.

20. A method according to claim 18, wherein the step of extracting a positioning matrix from the scattering matrix comprises determining transmission properties from comparisons between amplitude and phase of transmitted test signals as well as amplitude and phase of received test signals, and determining distances between transmitting antenna units and receiving antenna units based on said comparisons.

21. A method according to claim 18, wherein the step of extracting a positioning matrix from the scattering matrix comprises using a previously known data sequence for each test signal, and extracting a positioning matrix from the scattering matrix by correlating all transmitted test signals with all received test signals, and using detected time differences between transmitted test signals and received test signals.

22. A method according to claim 16, wherein each signal port of at least one antenna unit is used for transmitting and receiving digital baseband signals.

23. A method according to claim 22, wherein, for each of said at least one antenna unit, the method comprises:
feeding a respective test signal to each of at least two different antenna elements via corresponding signal ports;
for each such test signal, receiving the test signal from at least one other antenna element via a corresponding signal port;
determining relative positions of said antenna elements based on the received test signals, and
determining relative orientations of said antenna elements based on data received from the sensor units.

24. A method according to claim 16, wherein at least one signal port is used for transmitting and receiving RF, radio frequency, signals.

25. A method according to claim 16, wherein at least two first set ports, in a first set of ports, are connected to at least two second set ports, in a second set of ports, in dependence of the determined relative positions and relative orientations, where each port in the first set of ports at least indirectly is connected to a signal port.

26. A method according to claim 25, wherein the method comprises detecting to which signal ports the first set of ports at least indirectly are connected.

27. A method according to claim 16, wherein a modulated signal is used as test signal.

28. A method according to claim 16, wherein at least one of a single CW, continuous wave, a modulated UTRA, UMTS, Universal Mobile Telecommunications System, Terrestrial Radio Access, signal, an E-UTRA, Evolved UMTS Terrestrial Radio Access, signal, or a signal with correlation properties for calculating time difference is used as test signal.

29. A method according to claim 16, wherein the method comprises combining said determined relative positions and said determined relative orientations to form a total matrix, comparing the total matrix with a set of predefined antenna matrixes and choosing the predefined antenna matrix that best corresponds to the total matrix.

* * * * *